(12) United States Patent
Lee

(10) Patent No.: US 6,327,653 B1
(45) Date of Patent: Dec. 4, 2001

(54) TECHNIQUE FOR EASILY CHANGING OPERATING SYSTEMS OF A DIGITAL COMPUTER SYSTEM USING AT LEAST TWO PUSHBUTTONS

(75) Inventor: Sang-Jin Lee, Kyungki-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/197,691

(22) Filed: Nov. 23, 1998

Related U.S. Application Data

(63) Continuation-in-part of application No. 08/744,815, filed on Nov. 6, 1996.

(30) Foreign Application Priority Data

Nov. 7, 1995 (KR) ................................................. 95/40101

(51) Int. Cl.⁷ .............................. G06F 13/00; G06F 9/46; G06F 9/445; G06F 9/455; G06F 9/22

(52) U.S. Cl. ............................. 713/100; 713/2; 713/300; 713/310; 713/320; 713/323; 713/324; 710/104; 710/105; 710/107; 710/126; 710/129; 710/131; 717/11; 709/320

(58) Field of Search .............................. 710/47, 36, 104, 710/105, 107, 126, 129, 131, 260, 261; 709/100, 222, 320; 360/61; 379/384; 463/38; 399/9; 713/5, 100, 1, 2, 300, 310, 320, 323, 324; 717/11

(56) References Cited

U.S. PATENT DOCUMENTS

| | | | |
|---|---|---|---|
| 4,348,701 | * 9/1982 | Kanayama et al. | 360/61 |
| 4,493,034 | 1/1985 | Angelle et al. | |
| 4,539,437 | * 9/1985 | Giacopelli et al. | 379/384 |
| 4,675,814 | 6/1987 | Murai et al. | 717/11 |
| 4,768,149 | * 8/1988 | Konopik et al. | 710/47 |
| 4,870,389 | * 9/1989 | Ishiwata et al. | 463/38 |
| 5,278,973 | 1/1994 | O'Brien et al. | 717/11 |
| 5,297,282 | 3/1994 | Meilak et al. | |
| 5,327,531 | 7/1994 | Bealkowski et al. | |
| 5,355,498 | 10/1994 | Provino et al. | |

(List continued on next page.)

FOREIGN PATENT DOCUMENTS

| | | | |
|---|---|---|---|
| 61016352A | * 1/1986 | (JP) | G06F/13/00 |
| 61221921A | * 10/1986 | (JP) | G06F/1/00 |
| 01004838A | * 1/1989 | (JP) | G06F/9/46 |
| 02003828A | * 1/1990 | (JP) | G06F/9/445 |
| 04191927A | * 7/1992 | (JP) | G06F/9/06 |
| 07152509A | * 6/1995 | (JP) | G06F/3/12 |
| 10260758A | * 9/1998 | (JP) | G06F/3/00 |

*Primary Examiner*—Thomas Lee
*Assistant Examiner*—Katharina Schuster
(74) *Attorney, Agent, or Firm*—Robert E. Bushnell, Esq.

(57) ABSTRACT

A technique for easily changing an operating system or working mode of a digital computer system includes: a CPU (central processing unit) for processing computer programs; a bus which transmits information to each system element by connecting elements to each other; a first memory connected to said bus, for temporarily storing system software and user software executed by the CPU; a second memory connected to said bus, for storing a system initialization program executed within the CPU; a backup memory which is connected to said bus and stores an operating system of a user by storing information of said first memory and system hardware; and a button detector for detecting operation of one of a plurality of buttons, each of said plurality of buttons corresponding to an operating system or working mode, said button detector providing an output to said central processing unit via said bus for causing the computer system to change operating systems or working modes in response thereto.

26 Claims, 8 Drawing Sheets

U.S. PATENT DOCUMENTS

| | | |
|---|---|---|
| 5,386,552 | 1/1995 | Garney . |
| 5,386,565 | 1/1995 | Tanaka et al. . |
| 5,410,713 | 4/1995 | White et al. . |
| 5,414,860 | 5/1995 | Canoca, Jr. et al. ................. 713/340 |
| 5,432,935 | 7/1995 | Kato et al. ........................... 709/320 |
| 5,432,939 | 7/1995 | Blackledge, Jr. et al. . |
| 5,481,714 | 1/1996 | Pipkin et al. . |
| 5,483,647 | 1/1996 | Yu et al. .............................. 713/100 |
| 5,487,161 | 1/1996 | Koenck et al. . |
| 5,511,217 * | 4/1996 | Nakajima et al. ................... 709/100 |
| 5,546,585 | 8/1996 | Soga . |
| 5,557,777 | 9/1996 | Culbert . |
| 5,585,677 | 12/1996 | Choen et al. . |
| 5,664,203 | 9/1997 | Hong et al. . |
| 5,666,584 * | 9/1997 | Akashi et al. ........................... 399/9 |
| 5,708,820 | 1/1998 | Park et al. . |
| 5,710,930 | 1/1998 | Laney et al. . |
| 5,715,464 | 2/1998 | Crump et al. . |
| 5,845,078 * | 12/1998 | Tezuka et al. ....................... 709/222 |

* cited by examiner

TECHNIQUE FOR EASILY CHANGING OPERATING SYSTEMS OF A DIGITAL COMPUTER SYSTEM USING AT LEAST TWO PUSHBUTTONS

CROSS-REFERENCE TO RELATED APPLICATIONS

This application is a continuation-in-part of Applicant's Ser. No. 08/744,815, filed in the U.S. Patent & Trademark Office on Nov. 6, 1996 and makes claims to all benefits accruing under 35 U.S.C. §120.

CLAIM OF PRIORITY

This application makes claims all benefits accruing under 35 U.S.C. §119 from an application for DIGITAL COMPUTER SYSTEM CAPABLE OF EASILY CHANGING OPERATING SYSTEM AND USING METHOD THEREOF earlier filed in the Korean Industrial Property Office on the 7th of November 1995 and there duly assigned Serial No. 40101/1995.

BACKGROUND OF THE INVENTION

1. Field of the Invention

The present invention relates to a technique for enabling a digital computer system to easily change its operating system or working mode and, more particularly, to a technique for enabling a digital computer system to easily change its operating system while under a different operating system or to easily change its working mode under the same operating system.

2. Description of the Related Art

Many kinds of operating systems may be used in one digital computer system due to the widespread use and applications of a computer in which the necessary application programs under each operating system are executed. Thus, changing the operating system is needed.

For example, in personal computers (PCS), changing the operating system is effected between executing application programs under a disk operating system (DOS) of a text mode and executing application programs under Windows 95 or 98, a PC function and a settop box function, a PC function and a network terminal function, and a PC function and a television function.

Earlier digital computer systems included: a CPU (central processing unit); a RAM (random access memory) for temporarily storing the system software and user software executed by the CPU (central processing unit); a ROM (read only memory) for storing system initialization programs executed by the CPU (central processing unit); a RTC (real time clock) which stores information of a time calculation and a system composition; a bus which transmits information to each element with connecting elements; a user interface having a display unit and a keyboard; a serial/parallel peripheral device having an RS-232C interface unit and a printer; an auxiliary memory having a floppy disk drive and a hard disk drive; an interface controller having a display controller and a keyboard controller; a serial/parallel port having a serial interface and a parallel interface; and an auxiliary memory controller having a floppy disk drive controller and a hard disk drive controller.

If power is supplied to the computer system, the CPU executes an initialization process so that the hardware elements, such as the RAM, the user interface controller, and the auxiliary memory controller, are operated by a control program within the ROM, and a self-test process is executed in order to examine whether each hardware element is operating normally.

The control program is a POST (power on self test) of a BIOS (basic input output system) program within the ROM in a personal computer.

When the above process is over, the CPU loads a boot program, which is loaded from a specific place in the auxiliary memory, such as the floppy disk drive or the hard disk drive, into the RAM by a bootstrap loader within the control program, and executes the boot program.

While the boot program executes, an user executes an application program by selecting one operating system, that is, one operating system from among many kinds of operating systems.

The boot program loads the operating system selected by the user into the RAM, and the it operating system executes an operating system initialization process in a computer system and remains in a wait state to receive an instruction from the user.

When in the wait state, the user inputs instructions and executes the work to be done by executing an application program. And, when the work is terminated, the operating system shutdown procedure is executed to escape the operating system.

However, the above shutdown procedure need not be executed in an operating system such as DOS.

At last, the user turns the power off and all the work is terminated.

It takes a long time to execute a specific application program. The instructions must be input again and again in order to execute an application program.

When the power of the computer system is turned off during an operation, the above operation is needed in order to restore the power and to repeat the operation.

When an application is to be executed under another operating system, the above operation needs to be repeated.

U.S. Pat. No. 5,297,282, to Meilak et al., entitled Resume Processing Function For The OS/2 Operating System discloses an arrangement for storing an operating system in a back-up memory and then utilizing the stored information in a back-up memory to restart the computer upon the power being restored.

The following additional references also bear features in common with the present invention: U.S. Pat. No. 5,278,973 to O'Brien et al., entitled Dual Operating System Computer, U.S. Pat. No. 5,327,531 to Bealkowski, entitled Data Processing System Including Corrupt Flash ROM Recovery, U.S. Pat. No. 5,355,498 to Provino, et al., entitled Method And Apparatus For Booting A Computer System Without Loading A Device Driver Into Memory, U.S. Pat. No. 5,386,565 to Tanaka et al., entitled Method And System For Controlling/Monitoring Computer System Having Plural Operating Systems To Run Thereon, U.S. Pat. No. 5,414,860 to Canova Jr. et al., entitled Power Management Initialization For A Computer Operable Under A Plurality Of Operating Systems, U.S. Pat. No. 5,432,935 to Kato et al., entitled Emulation For Executing A Second Language Application Program On A Computer Having A First Language Operating System, U.S. Pat. No. 5,432,939 to Blackledge Jr. et al., entitled Trusted Personal Computer System With Management Control Over Initial Program Loading, U.S. Pat. No. 5,481,714 to Pipkin et al., entitled Method And System for Installing An Operating System On A Data Processing System With Abort Capability And voice Input Feature, U.S. Pat. No. 5,483,647 to Yu et al., entitled System For Switching Between Two Different Operating Systems By Invoking The Server To Determine Physical Conditions To Initiate A Physical Connection Transparent To The User, U.S. Pat. No. 5,487,161 to Koenck et al., entitled Computerized Data Terminal With Switchable Memory Address For Start-Up And System Control Instructions, U.S. Pat. No. 5,546,585 to Soga, entitled Personal Computer System With Start-Up Capability From An External Mass Storage Device, U.S. Pat. No. 5,557,777 to Culbert, entitled Method And Apparatus For System Recovery From Power Loss, U.S. Pat. No. 5,386,552 to Garney, entitled Preservation Of A computer System Processing State In A Mass Storage Device, U.S. Pat. No. 5,664,203 to Hong et al., entitled Peripheral Device Input-Initiated Resume System For combined Hibernation System And Back-Up Power Supply For Computer, U.S. Pat. No. 5,710,930 to Laney et al., entitled Apparatus And A Method For Allowing An Operating System Of A Computer System To Persist A Cross A Power Off And On Cycle, U.S. Pat. No. 5,708,820 to Park et al., entitled Network Hibernation System For Suspending And Resuming Operation Of Computer System Operable In Network Environment In Event Of Power Failure Or Period Of Inactivity, U.S. Pat. No. 5,410,713 to White et al., entitled Power-Management System For A Computer, U.S. Pat. No. 4,675,814 to Murai et al., entitled Method Of Switching Operating Systems For A Data Processing System, U.S. Pat. No. 4,493,034 to Angelle et al., entitled Apparatus And Method For An Operating System Supervisor In A Data Processing System, and U.S. Pat. No. 5,715,464 to Crump et al., entitled Computer System Having Suspend Once Resume Many Sessions.

SUMMARY OF THE INVENTION

It is an object of the present invention to provide a technique for enabling a digital computer system to easily change its operating system, which reduces the execution time of the specific application program and uses a backup memory to quickly change to another operating system in a digital computer system having a different operating system.

To achieve the above object, the present invention includes: a CPU for processing computer programs; a bus which transmits information to each system element with connecting elements; a first memory connected to the bus, for temporarily storing the system software and user software executed by the CPU; a second memory connected to the bus, for storing system initialization programs executed within the CPU; a peripheral device; an interface which is connected between the peripheral device and the CPU through the bus; a backup memory which is connected to the bus and stores a operating system of an user by storing information of the first memory and system hardware; and a power controller which maintains an external power until the present operating system is stored in the backup memory even when the power is turned off.

In another aspect of the present invention, the process of executing a specific operation in a digital computer system which is controlled by the CPU according to the present invention includes the steps of: supplying power to a computer system; initializing a user interface by a control program within a second memory and selecting an operating system to be executed; determining whether information of the selected operating system is stored in a memory block of the backup memory; loading an operating system of a peripheral device in a first memory by using a bootstrap loader of the control program and executing the operating system, if the information is not stored in the memory block; executing the application program for a specific operation under the operating system executed by the above step; setting hardware by using information stored in the memory block and writing it in the first memory; executing application programs with the operating system; turning the power switch off and stopping the work; storing a state of the hardware and contents of the first memory in a corresponding memory block of the work situation; and turning off the power with the power controller.

In still another aspect of the present invention, the process of changing operating systems in a digital computer system according to the present invention includes the steps of: executing an application program with an operating system; discontinuing the work and requesting another operating system; storing the operating system under execution in a memory block within a backup memory; setting a computer system state with the information stored in the requested memory block so as to operate the requested operating system; and executing application programs with the requested operating system.

In another aspect of the present invention, a digital computer system capable of easily changing from one operating system to another operating system includes: a central processing unit for processing computer programs; a bus for transmitting information to each of a plurality of system elements of the system by connecting said central processing unit to said plurality of system elements; a first memory connected to said bus, for temporarily storing system software and user software executed by said central processing unit; a second memory connected to said bus for storing system intialization programs executed by said central processing unit; a backup memory connected to said bus for storing operating system information and system hardware information; and a button detector for detecting operation of one of a plurality of buttons, each of said plurality of buttons respectively corresponding to an operating system, said button detector providing an output to said central processing unit via said bus for causing the computer system to change operating systems in response thereto.

In still another aspect of the present invention, a method of changing the operating system in a digital computer system capable of easily changing its operating system includes the steps of: executing an application program with a first operating system upon operating a first button; discontinuing the operation of the first operating system and requesting a second operating system upon operating a second button; storing the first operating system in a memory block within a backup memory; setting a computer system state with information stored in a requested memory block to operate the requested second operating system; and executing application programs with the requested second operating system.

In another aspect of the present invention, the computer can easily change from one working mode to another working mode while in the same operating system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will become apparent from a study of the following detailed description with reference to the accompanying drawings.

Figure 1:
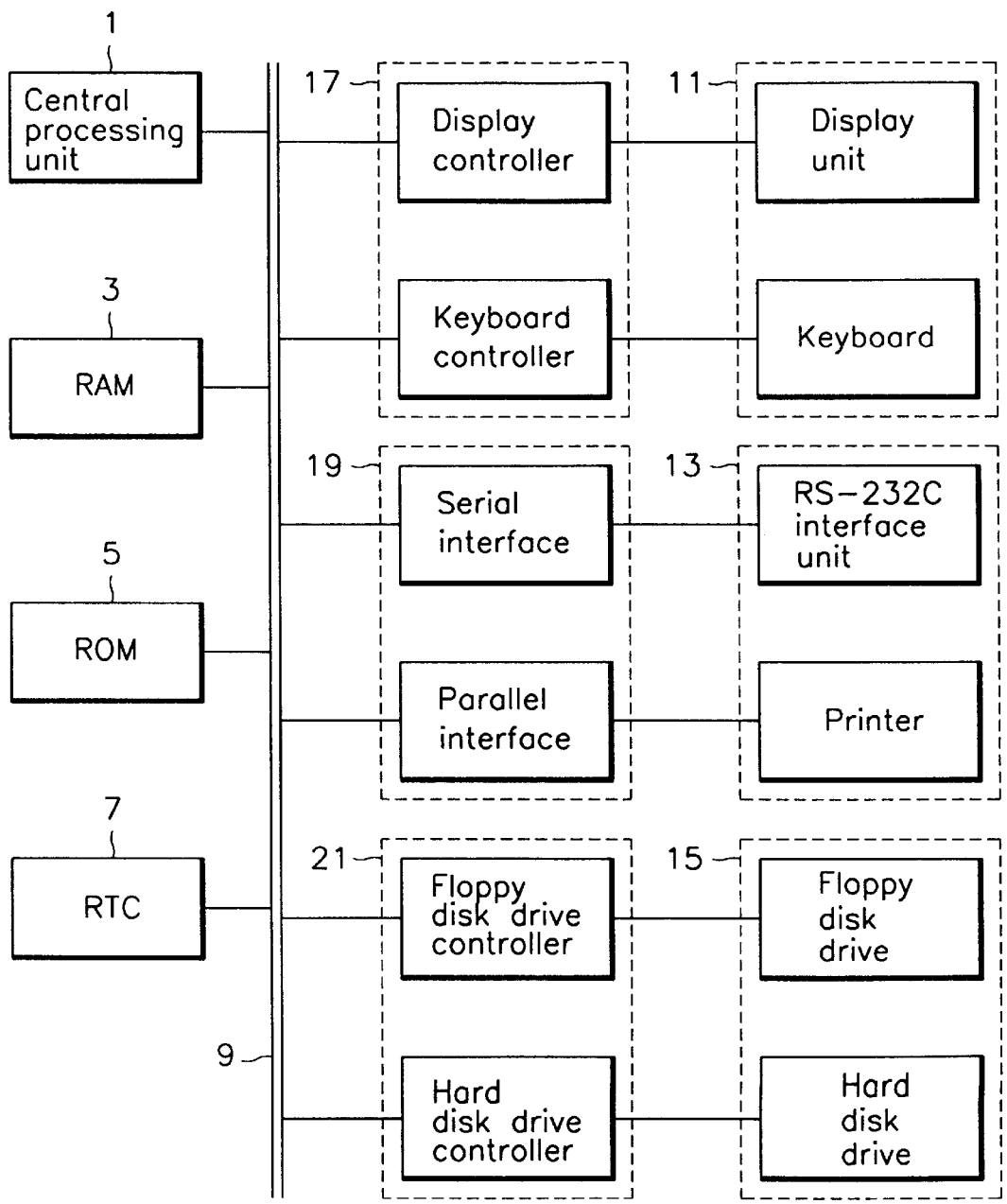
FIG. 1 is a block diagram of an earlier digital computer system.

As shown in FIG. 1, an earlier digital computer system includes:

a CPU 1;

a RAM 3 for temporarily storing the system software and user software executed by the CPU;

a ROM 5 for storing system initialization programs executed by the CPU;

a RTC (real time clock) 7 which stores information of a time calculation and a system composition;

a bus 9 which transmits information to each element with connecting elements;

a user interface 11 having a display unit and a keyboard;

a serial/parallel peripheral device 13 having an RS-232C interface unit and a printer;

an auxiliary memory 15 having a floppy disk drive and a hard disk drive;

an interface controller 17 having a display controller and a keyboard controller;

a serial/parallel port 19 having a serial interface and a parallel interface; and an auxiliary memory controller 21 having a floppy disk drive controller and a hard disk drive controller.

Figure 2:
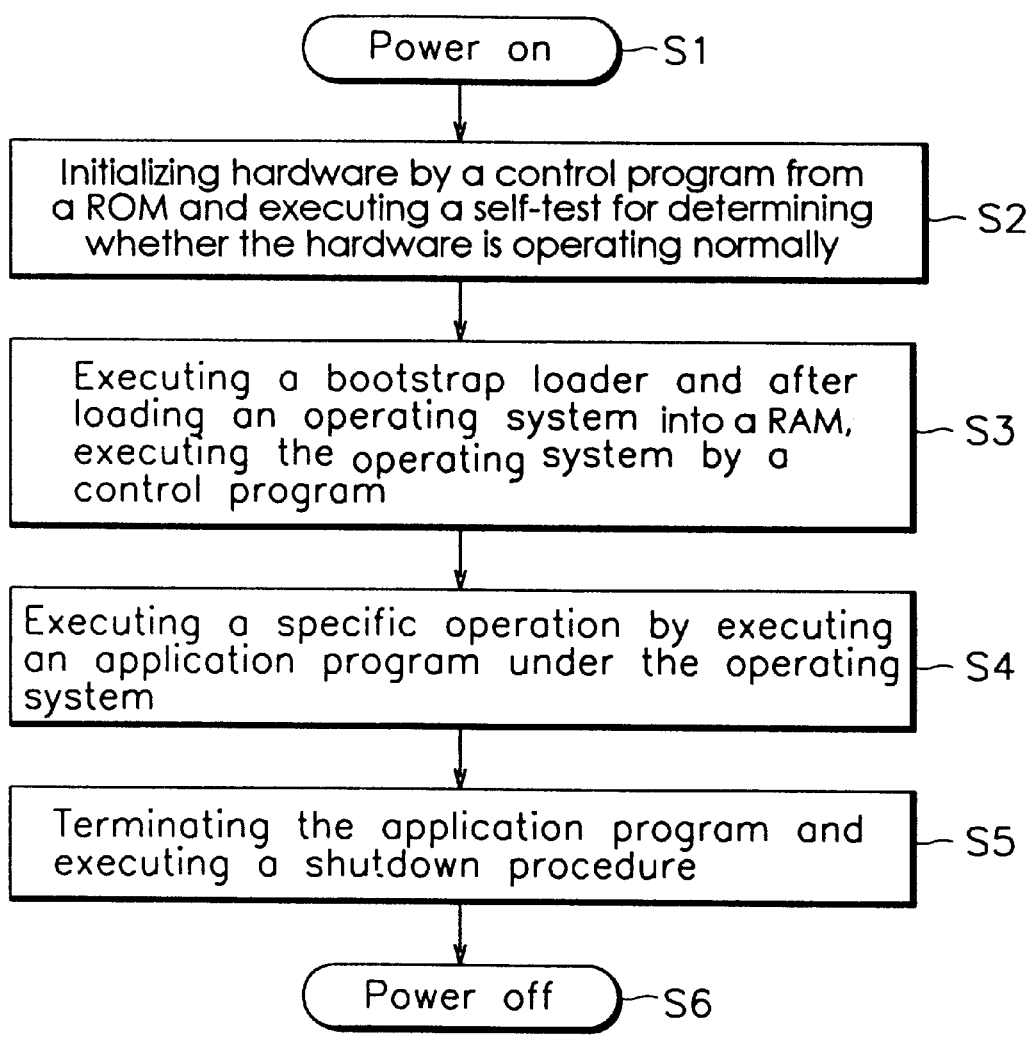
FIG. 2 is a flowchart showing the process of executing a specific operation in the earlier digital computer system.

If power is supplied to the computer system (see step S1 of FIG. 2), the CPU 1 executes an initialization process so that the hardware elements, such as the RAM 3, the user interface controller 17, and the auxiliary memory controller 21, are operated by a control program within the ROM 5, and a self-test process is executed in order to examine whether each hardware element is operating normally (S2).

The control program is a POST (power on self test) of a BIOS (basic input output system) program within the ROM 5 in a personal computer.

When the above process is over, the CPU loads a boot program, which is loaded from a specific place in the auxiliary memory 15, such as the floppy disk drive and the hard disk drive, into the RAM 3 by a bootstrap loader within the control program, and executes the boot program (S3).

While the boot program executes, an user executes an application program by selecting one operating system, that is, one operating system from among many kinds of operating systems (S3).

The boot program loads the operating system selected by the user into the RAM 3, and the operating system executes an operating system initialization process in a computer system and remains in a wait state to receive an instruction from the user (S3).

When in the wait state, the user inputs instructions and executes the work to be done by executing an application program (S4). And, when the work is terminated, the operating system shutdown procedure is executed to escape the operating system (S5).

However, the above shutdown procedure (S5) need not be executed in an operating system such as DOS (disk operating system).

At last, the user turns the power off and all the work is terminated (S6).

It takes a long time to execute a specific application program. The instructions must be input again and again in order to execute an application program.

When the power of the computer system is turned off during an operation, the above operation is needed in order to restore the power and to repeat the operation.

When an application is to be executed under another operating system, the above operation needs to be repeated.

Figure 3:
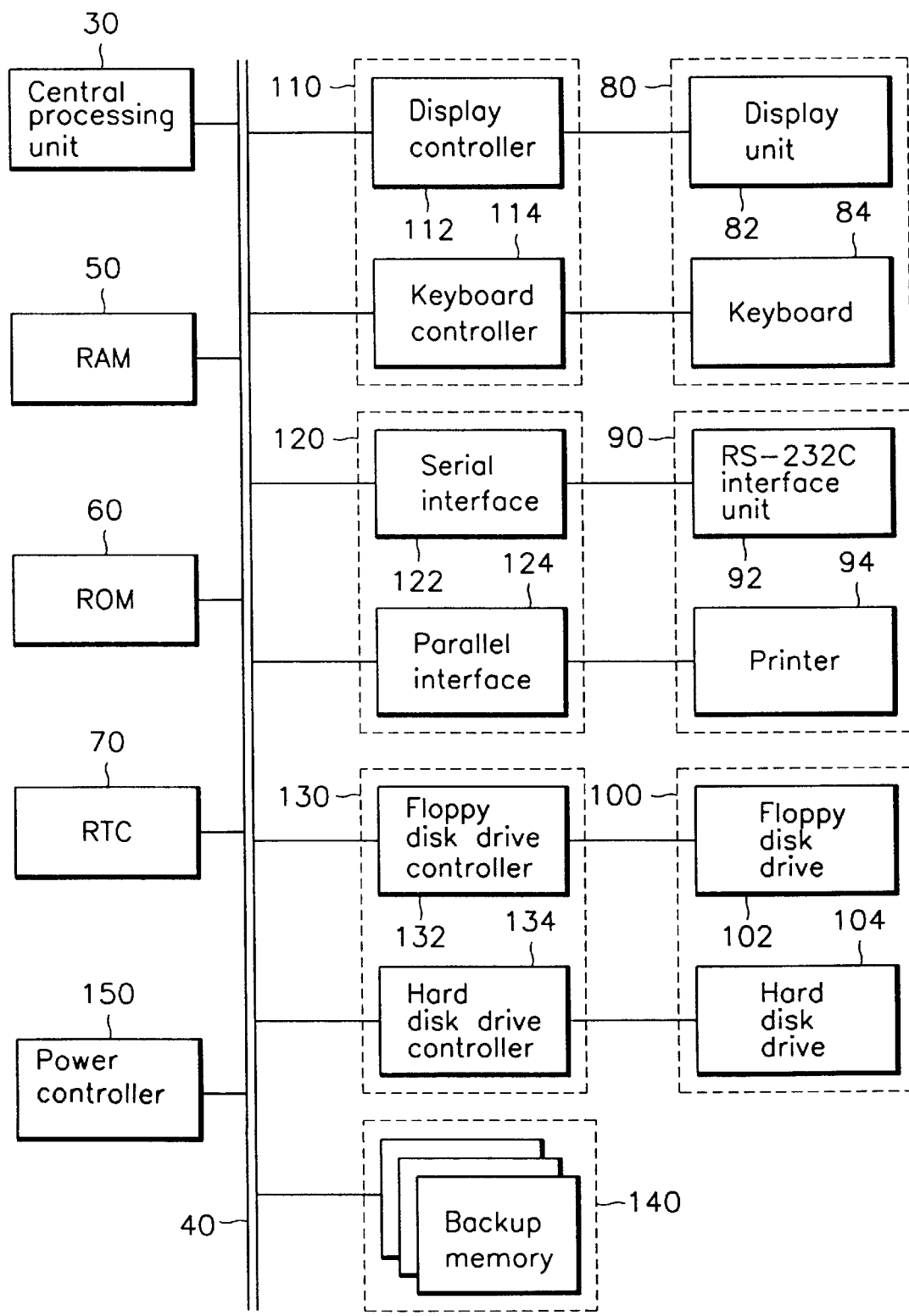
FIG. 3 is a block diagram of a digital computer system capable of easily changing operating systems in accordance with a preferred embodiment of the present invention.

As shown in FIG. 3, a digital computer system capable of easily changing operating systems in accordance with a preferred embodiment of the present invention includes:

a CPU (central processing unit) 30 for processing computer programs;

a bus 40 which transmits information to each system element with connecting elements;

a RAM (random access memory) 50 connected to the bus, for temporarily storing the system software and user software executed by the CPU;

a ROM (read only memory) 60 connected to the bus, for storing a system initialization program executed within the CPU;

an RTC (real time clock) 70 which stores information of a time calculation and a system composition;

a user interface 80 having a display unit 82 and a keyboard 84;

a serial/parallel peripheral device 90 having an RS-232C interface unit 92 and a printer 94;

an auxiliary memory 100 having a floppy disk drive 102 and a hard disk drive 104;

an interface controller 110 having a display controller 112 and a keyboard controller 114;

a serial/parallel port 120 having a serial interface 122 and a parallel interface 124;

an auxiliary memory controller 130 having a floppy disk drive controller 132 and a hard disk drive controller 134;

a backup memory 140 which is connected to the bus 40, and stores an operating system of a user by storing information of the RAM 50 and system hardware; and a power controller 150 which maintains an external power until a present operating system is stored in the backup memory 140 even when the power is turned off The backup memory 140 in accordance with a preferred embodiment of the present invention includes at least one memory block which is connected to the bus 40.

The backup memory 140 may include a RAM capable of reading and writing so that the CPU 30 can execute a specific operating system through the bus 40, and further includes a ROM storing specific programs that are read only and executed by the CPU 30.

The power controller 150 is disclosed in detail in U.S. Pat. No. 5,708,820 to Noh-Byung Park et al. and U.S. Pat. No. 5,585,677 to Kyung-Yong Cheon et al.

Figure 4:
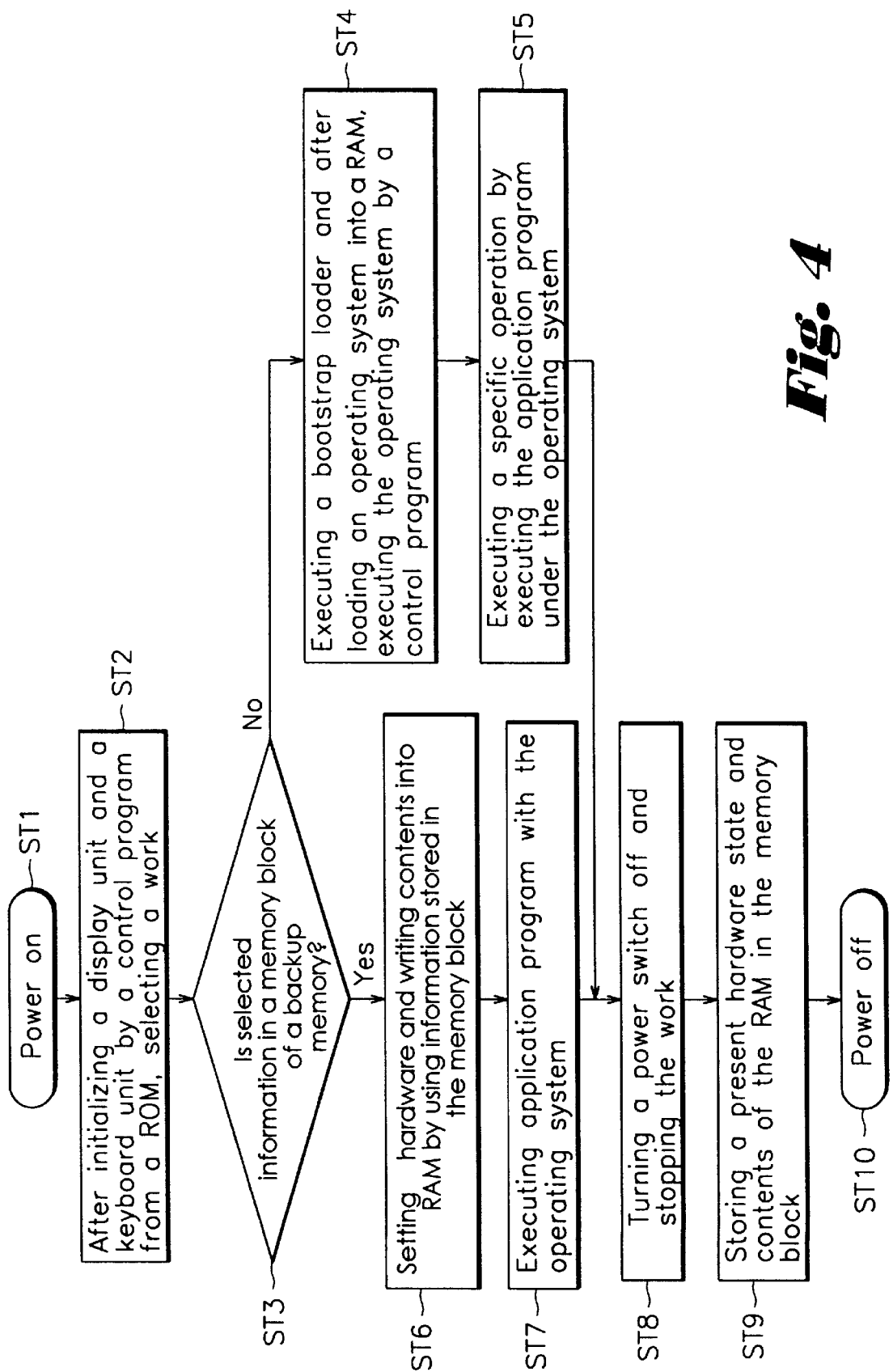
FIG. 4 is a flowchart showing the process of executing a specific operation in the digital computer system capable of easily changing operating systems in accordance with a preferred embodiment of the present invention.

As shown in FIG. 4, the process of executing a specific work in the digital computer system capable of easily changing its operating system in accordance with a preferred embodiment of the present invention includes the steps of:

supplying power to a computer system (ST1);

initializing a user interface by a control program within the ROM and selecting an operating system to be executed (ST2);

determining whether information of a selected operating system is stored in a memory block of the backup memory 140 (ST3);

loading an operating system of a peripheral device in the RAM 50 by using a bootstrap loader of the control program and executing the operating system if the information is not stored in the memory block (ST4);

executing the application program for a specific operation under the operating system by the above step (ST5);

setting hardware by using the information stored in the memory block and writing it into the RAM 50 if the information is stored in the memory block (ST6);

executing application programs with the operating system (ST7);

turning the power switch off and stopping the operation (ST8);

storing a state of the hardware and contents of the RAM 50 in the memory block storing the operating system (ST9); and turning off the power with the power controller 150 (ST10).

Figure 5:
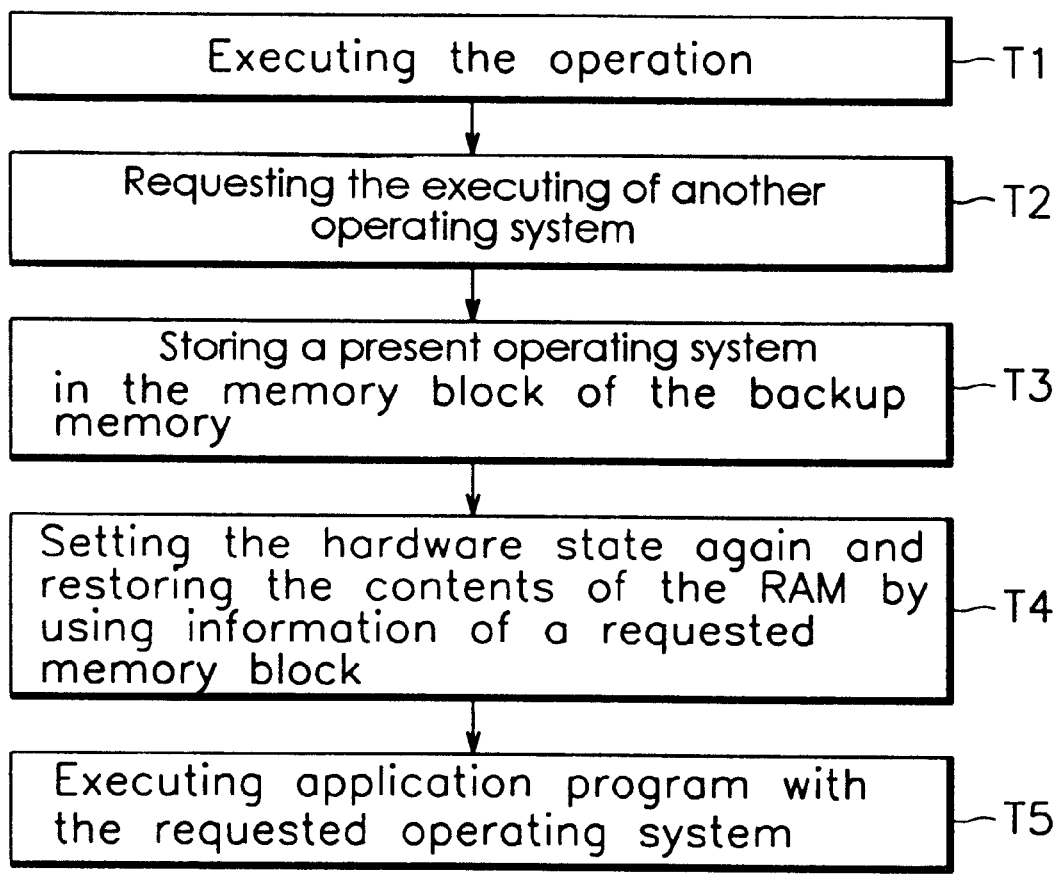
FIG. 5 is a flowchart showing the process of changing the operating system in the digital computer system capable of easily changing operating systems in accordance with a preferred embodiment of the present invention.

As shown in FIG. 5, the process of changing the operating system in a digital computer system capable of easily changing its operating system in accordance with a preferred embodiment of the present invention includes the steps of:

executing an application program with an operating system (T1);

discontinuing the work under execution and requesting another operating system (T2);

storing the operating system under execution in the memory block within the backup memory 140 (T3);

setting a system state by the information stored in the requested memory block so as to load the requested operating system (T4); and executing an application program with the requested operating system (T5).

The process of executing a specific operation in the digital computer system capable of easily changing its operating system in accordance with a preferred embodiment of the present invention is described as follows.

When power is supplied to the computer system (ST1), the CPU 30 initializes the display controller 112 and the keyboard controller 114 through the bus 40 by control of the control program within the ROM 60 (ST2);

The CPU 30 displays a menu with a memory block number and description of the backup memory 140 on the display device 82 connected to the display controller 112 (ST2).

The user selects an operating system from among the operating systems in the menu through the keyboard 84 of the user interface 80 connected to the keyboard controller 114 (ST2).

If the user does not select an operation through the keyboard 84 during a regular time, a previously stored default setting is selected by a control program.

The user may appoint a brief description of each memory block indicated in the menu through a set-up program. The information of a wait time, the default number, and the type of backup memory (RAM or ROM) is stored in a register within the RTC (real time clock) 70 or in a separate non-volatile memory.

The control program determines whether information of a selected operating system is stored in the memory block of the backup memory 140 (ST3).

If the information is not stored in the memory block, the process progresses as follows.

The CPU 30 loads a boot program stored within the auxiliary memory 100 in the RAM 50 by using a bootstrap loader of the control program, and executes the boot program (ST4). The auxiliary memory 100 includes the floppy disk drive 102 and the hard disk drive 104, and is connected to the auxiliary memory controller 130 having the floppy disk drive controller 132 and the hard disk drive controller 134.

The boot program loads a selected operating system in the RAM 50. The operating system executes an initializing process in the computer system and then proceeds to a wait state for receiving an instruction from the user (ST4).

When in the wait state, the application is executed by inputting the instruction and the operation is executed (ST5).

Alternatively, if the information is stored in the memory block, the process progresses as follows.

The control program sets each hardware element state so as to fit a situation by using an operation state information of a system hardware stored in the selected memory block of the backup memory 140, reads data from the memory block, and restores the contents of the RAM 50 so as to fit in the operating system (ST6).

The application program stored in the RAM 50 receives a right of a system control from the control program and executes the selected operation (ST7).

The user turns a power switch off in order to terminate the operation (ST8).

Also, the power may be turned off automatically when the system is not used within a set time interval. The external power supplied to the system may also be turned off.

The power controller 150, sensing an off-state of the power outputs an interrupt signal to the CPU 30 through the BUS 40. The CPU 30 stores a present operating system of each hardware element state and the contents of the RAM 50 in the corresponding memory block by executing a corresponding interrupt program within the ROM 60 (ST9).

After the above step (ST9) is terminated, the interrupt program outputs a power off signal to the power controller 150 through the CPU 30. The power controller 150 turns off the power by the power off signal (ST10).

When the memory block of the backup memory 140 consists of a ROM, the above steps (ST9 and ST10) are omitted.

A description of the process of changing the work situation as shown in FIG. 5 follows.

The user executes the application program under a specific work situation (T1).

Executing a different work is requested by a combination of specific keys in order that the user stops a specific operation and executes an operation having a different operating system (T2).

Also, the user operates an operation changing switch corresponding to the memory block of the backup memory 140 external to the computer system and requests another operation by selecting and operating the switch. Another method is that the user decides a specific function key indicating an operation menu and requests another operation when the function key is selected and indicated in the menu.

An interrupt signal is generated when requested by the user, and the CPU 30 receiving the interrupt signal executes corresponding interrupt program within the ROM 60 (T3).

The corresponding interrupt program stores the present operating system of the hardware element state and the contents of the RAM 50 in the corresponding memory block within the backup memory (T3).

When the memory block of the backup memory 140 consists of a ROM, the above step (T3) is omitted.

The interrupt program again sets each hardware element state so as to adapt to a situation by using an operation state information of a system hardware element stored in the memory block of the backup memory 140, and changes the contents of the RAM 50 so as to adapt to the operating system by reading data from the memory block (T4).

The application program stored in the RAM 50 receives a right of a system control from the interrupt program and executes the requested work (T5).

Figure 6:
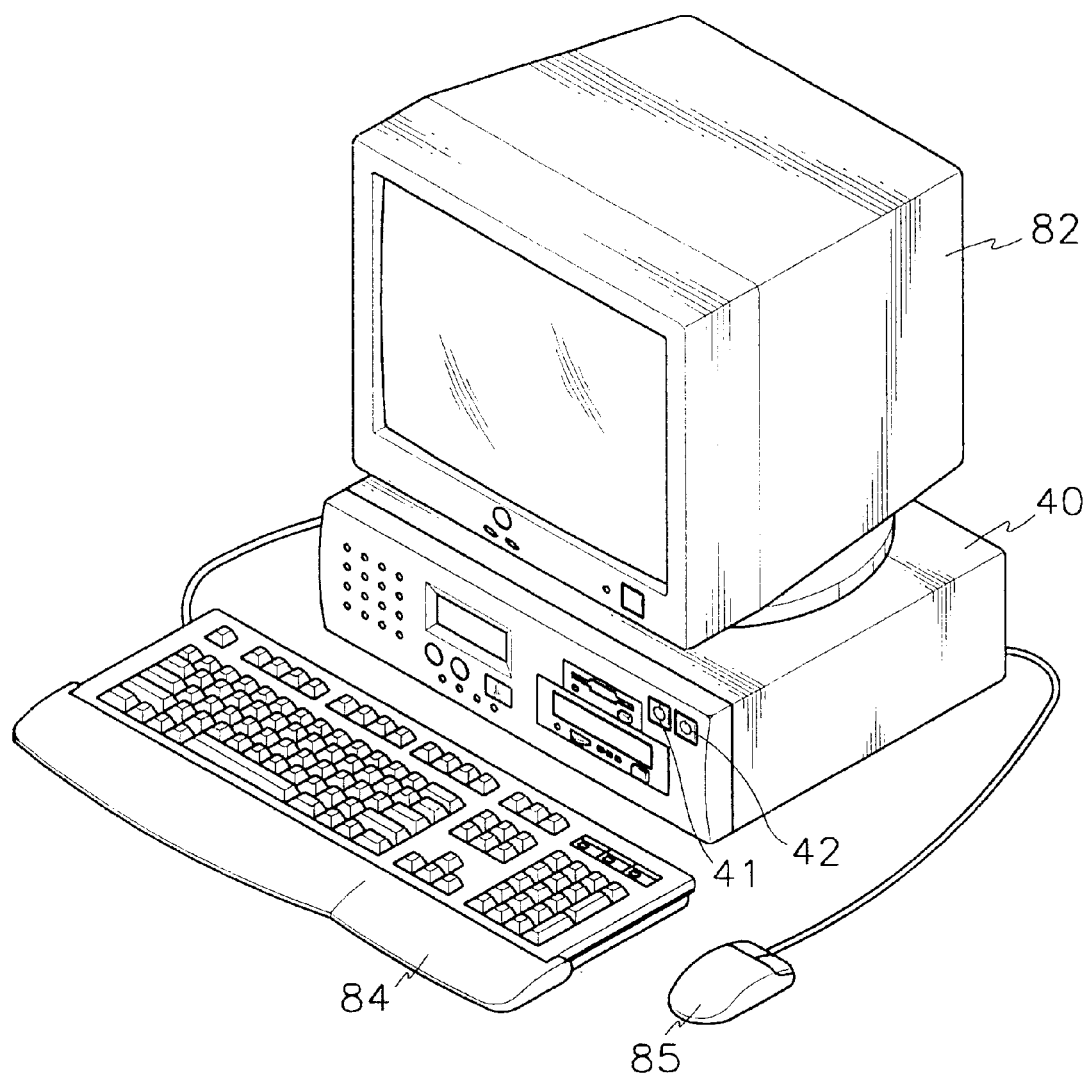
FIG. 6 is a perspective view of a computer system according to a second embodiment of the present invention.
Figure 7:
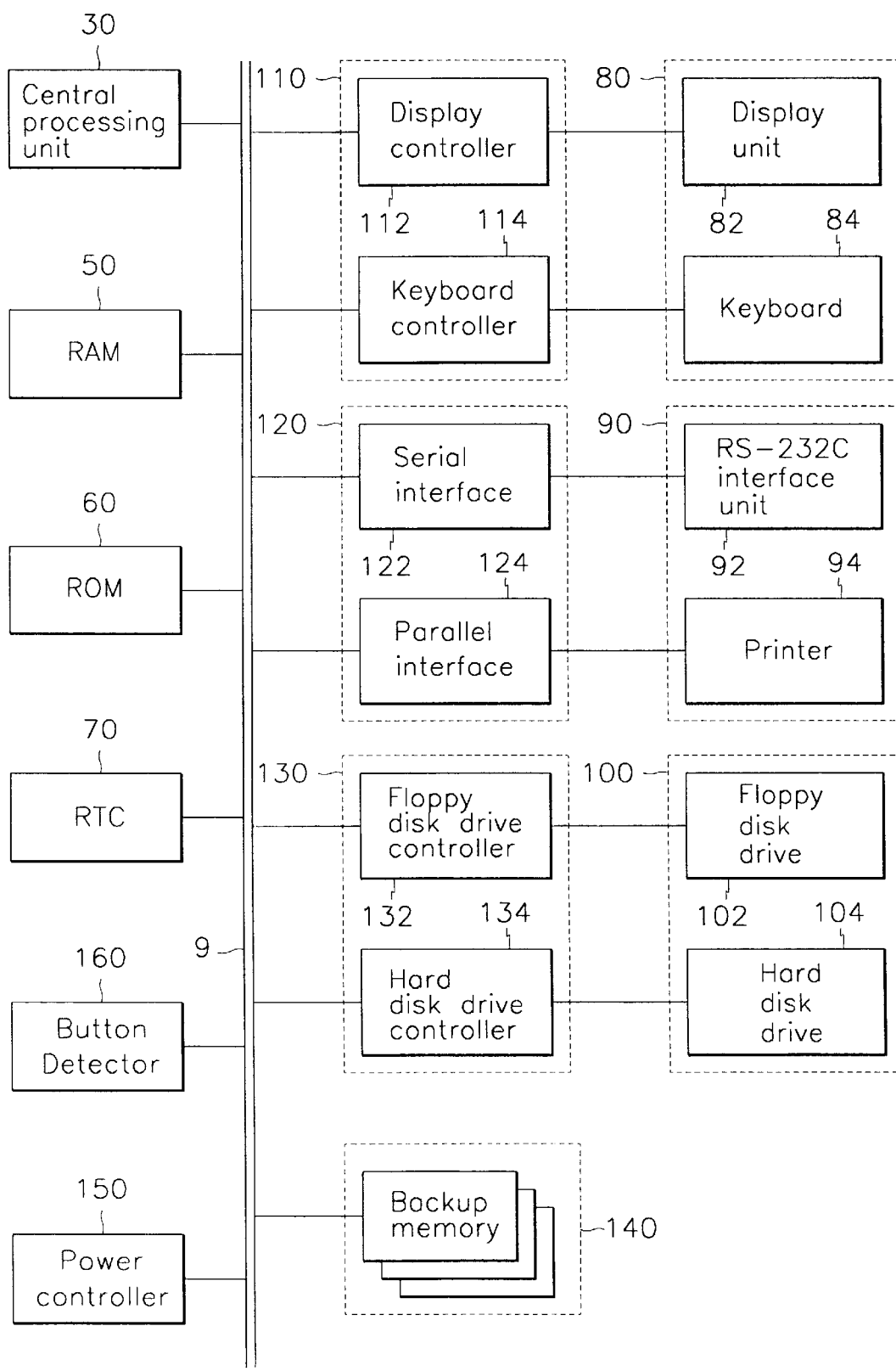
FIG. 7 is a block diagram of the computer system according to the second embodiment of the present invention.
Figure 8:
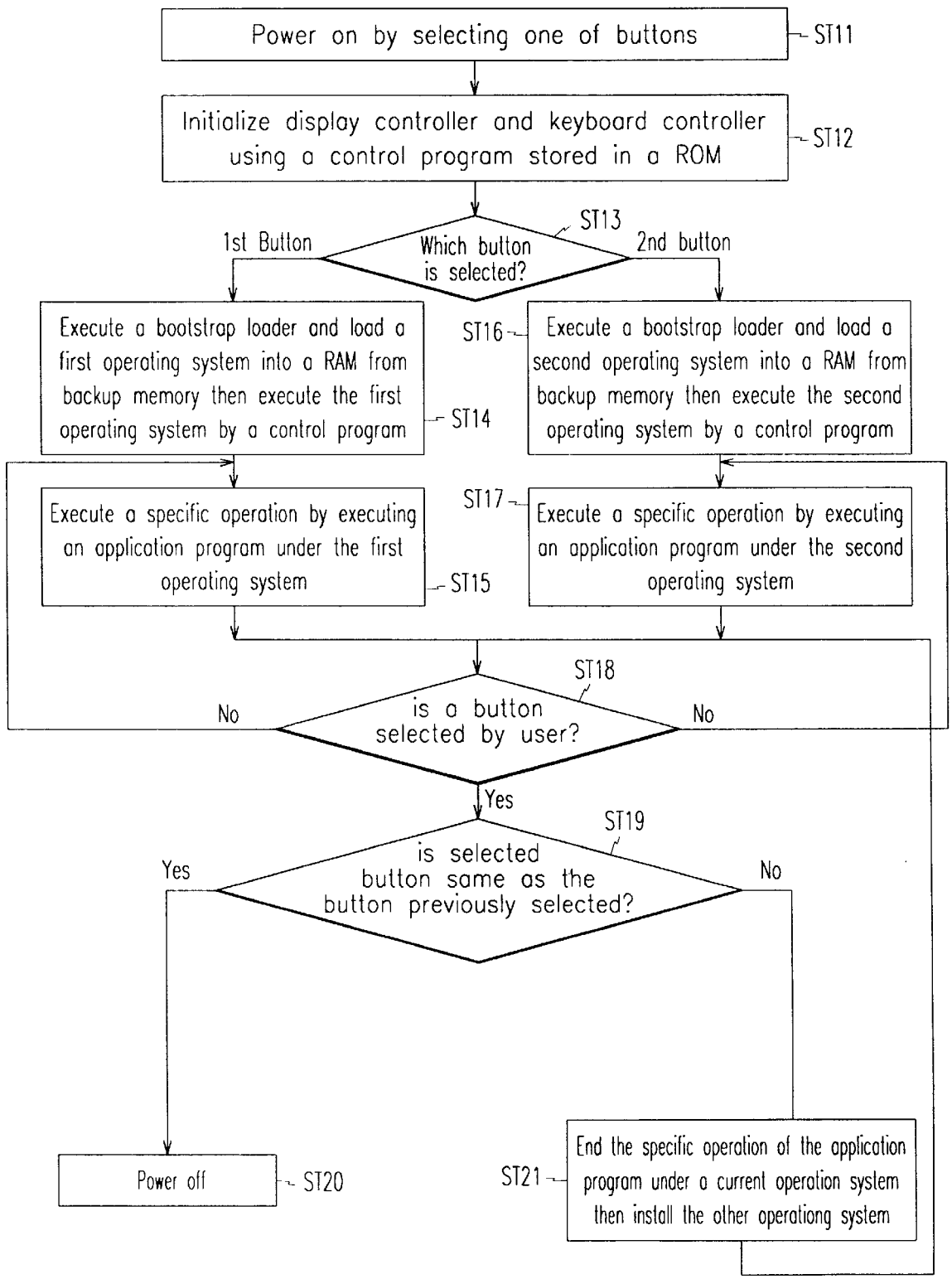
FIG. 8 is a flowchart of the operation of the computer system according to the second embodiment of the present invention.

Referring to FIGS. 6, 7 and 8, a digital computer system capable of easily changing its operating system in accordance with a second preferred embodiment of the present invention will be described below in detail.

FIG. 6 is a perspective view of a computer system according to the second preferred embodiment comprises a main body 40, a display unit 82, a keyboard 84, and a mouse 85. Further, power buttons 41 and 42 are installed on the main body 40.

The buttons 41 and 42 are used to turn computer systems power on/off, as well as to change the operating system (OS).

According to the second preferred embodiment of the present invention, if a user selects the button 41 to turn on the computer system, a first operating system (e.g., Windows) is installed during the booting process, and a second operating system is installed if the button 42 is selected.

The computer system operating under the first operating system shuts off, when the button 41 is pushed, or installs the second operating system if the button 42 is pushed during operation.

FIG. 7 is a block diagram of the computer system according to the second preferred embodiment of the present invention.

As shown by FIG. 7, the computer system according to the second preferred embodiment comprises, as shown in FIG. 3, for the first preferred embodiment, a central processing unit 30, a bus 40, a RAM 50, a ROM 60, a RTC 70, a user interface 80, a serial/parallel peripheral device 90, an auxiliary memory 100, an interface controller 110, a serial/parallel port 120, an auxiliary memory controller 130, and a button detector 160 (not shown in FIG. 3).

a backup memory 140 which is connected to the bus 40, and stores an operating system of a user by storing information of the RAM 50 and system hardware; and a power controller 150 which maintains an external power until a present operating system is stored in the backup memory 140 even when the power is turned off.

The backup memory 140 in accordance with a preferred embodiment of the present invention includes at least one memory block which is connected to the bus 40.

The backup memory 140 may include a RAM capable of reading and writing so that the CPU 30 can execute a specific operating system through the bus 40, and further includes a ROM storing specific programs that are read only and executed by the CPU 30.

The button detector 160 detects the selection of buttons 41 or 42, and outputs a result to the central processing unit 30 via the bus 40. The operations of the central processing unit 30, bus 40, RAM 50, ROM 60, RTC 70, user interface 80, serial/parallel peripheral device 90, auxiliary memory 100, interface controller 110, and the serial/parallel port 120 has already been discussed for the first preferred embodiment and a further explanation of their functions will not be provided.

Referring to FIGS. 6 to 8, the process or executing a specific task in the digital computer system capable of easily changing its operating system in accordance with the second preferred embodiment of the present invention will now be explained in detail.

If power is supplied to a computer system by selecting one of operating system buttons 41 or 42 (ST11), the CPU 30 executes an initializing process so that the hardware elements, such as the display controller 112 and the keyboard controller 114, are operated by a control program within the at ROM 50, and a power on self-test (POST) process is executed in order to determine whether or not each hardware element is operating normally (ST12).

The CPU 30 determines whether a selected system button is the first button 41 or the second button 42 according to the detected result from the button detector 160 (S13).

According to the determined result, if the first button 41 has been selected, the CPU 30 loads and installs a first boot program which is loaded from a first location the floppy disk drive 102 or the hard disk drive 104, into the RAM 50 by a bootstrap loader within the control program. The first boot program loads the first operating system, stored in the hard disk drive 104, corresponding to the selection of the first button 41 into RAM 50, and the first operating system executes an operating system initialization process in a computer system and remains in a wait state to receive an instruction from the user (ST14).

When in the wait state, the user inputs instructions and executes specific operation by executing an application program (ST15).

On the other hand, if it has been determined that the second button 42 is the selected button in ST13, the CPU 30 loads and installs a second boot program, which is loaded from a second location the floppy disk drive 102 or the hard disk drive 104, into the RAM 50 by the bootstrap loader within the control program. The second boot program loads the second operating system, stored in the hard disk drive 104, corresponding to the selection of the second button 42 into RAM 50, and the second operating system executes an operating system initialization process in a computer system and remains in a wait state to receive an instruction from the user (ST16).

When in the wait state, the user inputs instructions and executes specific operation by executing an application program (ST17).

At ST15 or ST17, the user pushes the buttons 41 or 42 to shutdown the system or to change the operating system (ST18).

In ST18, the button detector 160 detects whether a button has been selected, and if no selection of buttons has been detected, the process returns to ST15 or ST17. In ST19, if the button detector 160 detects a selection of a button, the CPU 30 determines whether the selected button is the same button previously selected.

If the selected button in ST18 is determined to be the same button previously selected, the CPU 30 executes the operating system shutdown procedure and turns off the computer (ST20).

However, if the selected button in ST18 is determined to different from the button previously selected, the CPU 30 ends the operation of the application program operating under a current operating system, and installs the other operating system corresponding to the selected button.

As described above, according to the second preferred embodiment of the present invention, by simply selecting the button 41 (or the button 42), a user can install the first operating system (or the second operating system), while the computer is operating under the second operating system (or the first operating system).

In the above described second preferred embodiment of the present invention, only two buttons have been disclosed; however, without departing from the spirit and scope of the invention a plurality of buttons can be utilized. Furthermore, the second preferred embodiment, which uses two buttons to perform both the functions of turning power on/off and executing a different operating system, can have a button to independently perform the function of turning power on/off and a button to independently install a different operating system.

The present invention provides a digital computer system capable of easily changing its operating system to a different operating system. The present invention includes a power controller and a backup memory. Thus, it takes a short time to execute a specific application program and the stored contents may be restored when the operation is stopped.

Though the preferred embodiment describes the computer system only changing from one operating system to another system using two buttons, the present invention can be applied to a computer system capable of changing from one working mode to another working mode, wherein the working modes are executed under the same operating system.

That is to say, the present invention includes the computer system capable of changing from one operating system to another operating system as well as a computer system capable of changing from one working mode to another working mode, both working modes being executed under the same operating system.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A digital computer system capable of easily changing from one working mode to another working mode, both working modes being executed under the same or different operating systems, comprising:
    a central processing unit for processing computer programs;
    a bus for transmitting information to each of a plurality of system elements of the system by connecting said central processing unit to said plurality of system elements;
    a first memory connected to said bus, for temporarily storing system software and user software executed by said central processing unit;
    a second memory connected to said bus for storing system initialization programs executed by said central processing unit;
    a backup memory connected to said bus for storing both working mode and operating system information and system hardware information; and
    a button detector for detecting operation of one of a plurality of buttons, each of said plurality of buttons respectively corresponding to a working mode, said button detector providing an output to said central processing unit via said bus for causing the computer system to change working modes in response thereto.

2. The system as claimed in claim 1, said backup memory comprising at least one memory block connected to said bus, said at least one memory block storing one operating system.

3. The system as claimed in claim 2, said plurality of buttons comprising first and second buttons.

4. The system as claimed in claim 3, an initial operation of said first button causing the central processing unit to turn on the computer system and install a first working mode program and a subsequent operation of the first button causing the turning off of the computer system, and
    an initial operation of said second button causing the central processing unit to turn on the computer system and install a second working mode program and a subsequent operation of the second button causing the turning off of the computer system,
    an operation of said second button after the operation of said first button causing the central processing unit to install said second working mode program, and
    an operation of said first button after the operation of said second button causing the central processing unit to install said first working mode program.

5. The system as claimed in claim 2, said backup memory comprising a random access memory, said central processing unit reading and writing, through said bus, said stored operating system from and to said random access memory.

6. The system as claimed in claim 5, said plurality of buttons comprising first and second buttons.

7. The system as claimed in claim 6, an initial operation of said first button causing the central processing unit to turn on the computer system and install a first working mode program and a subsequent operation of the first button causing the turning off of the computer system, and
    an initial operation of said second button causing the central processing unit to turn on the computer system and install a second working mode program and a subsequent operation of the second button causing the turning off of the computer system;
    an operation of said second button after the operation of said first button causing the central processing unit to install said second working mode program; and
    an operation of said first button after the operation of said second button causing the central processing unit to install said first working mode program.

8. The system as claimed in claim 2, said backup memory comprising a read only memory, said central processing unit only reading, through said bus, said stored operating system from said read only memory.

9. The system as claimed in claim 8, said plurality of buttons comprising first and second buttons.

10. The system as claimed in claim 9, an initial operation of said first button causing the central processing unit to turn on the computer system and install a first working mode program and a subsequent operation of the first button causing the turning off of the computer system, and
    an initial operation of said second button causing the central processing unit to turn on the computer system and install a second working mode program and a subsequent operation of the second button causing the turning off of the computer system;
    an operation of said second button after the operation of said first button causing the central processing unit to install said second working mode program; and an operation of said first button after the operation of said second button causing the central processing unit to install said first working mode program.

11. The system as claimed in claim 1, said plurality of buttons comprising first and second buttons.

12. The system as claimed in claim 11, an initial operation of said first button causing the central processing unit to turn on the computer system and install a first working mode program and a subsequent operation of the first button causing the turning off of the computer system, and an initial operation of said second button causing the central processing unit to turn on the computer system and install a second working mode program and a subsequent operation of the second button causing the turning off of the computer system;

an operation of said second button after the operation of said first button causing the central processing unit to install said second working mode program; and an operation of said first button after the operation of said second button causing the central processing unit to install said first working mode program.

13. A method of changing the operating system in a digital computer system capable of easily changing its operating system comprising the steps of:

executing an application program with a first operating system upon operating a first button;

discontinuing the operation of the first operating system and requesting a second operating system upon operating a second button;

storing the first operating system in a memory block within a backup memory;

setting a computer system state with information stored in a requested memory block to so operate the requested second operating system; and executing application programs with the requested second operating system.

14. The method as claimed in claim 13, further comprising the step of providing the backup memory with a read only memory having stored thereon a plurality of operating systems, including the first and the second operating systems.

15. A digital computer system capable of easily changing from one operating system to another operating system, comprising:

a central processing unit for processing computer programs;

a bus for transmitting information to each of a plurality of system elements of the system by connecting said central processing unit to said plurality of system elements;

a first memory connected to said bus, for temporarily storing system software and user software executed by said central processing unit;

a second memory connected to said bus for storing system initialization programs executed by said central processing unit;

a backup memory connected to said bus for storing operating system information for both operating systems and system hardware information; and a button detector for detecting operation of one of a plurality of buttons, each of said plurality of buttons respectively corresponding to an operating system, said button detector providing an output to said central processing unit via said bus for causing the computer system to change operating system in response thereto.

16. The system as claimed in claim 15, said backup memory comprising at least one memory block connected to said bus, said at least one memory block storing one operating system.

17. The system as claimed in claim 16, said plurality of buttons comprising first and second buttons.

18. The system as claimed in claim 17, an initial operation of said first button causing the central processing unit to turn on the computer system and install a first operating system and a subsequent operation of the first button causing the turning off of the computer system, and an initial operation of said second button causing the central processing unit to turn on the computer system and install a second operating system and a subsequent operation of the second button causing the turning off of the computer system, an operation of said second button after the operation of said first button causing the central processing unit to install said second operating system, and an operation of said first button after the operation of said second button causing the central processing unit to install said first operating system.

19. The system as claimed in claim 16, said backup memory comprising a random access memory, said central processing unit reading and writing, through said bus, said stored operating system from and to said random access memory.

20. The system as claimed in claim 19, said plurality of buttons comprising first and second buttons.

21. The system as claimed in claim 20, an initial operation of said first button causing the central processing unit to turn on the computer system and install a first operating system and a subsequent operation of the first button causing the turning off of the computer system, and an initial operation of said second button causing the central processing unit to turn on the computer system and install a second operating system and a subsequent operation of the second button causing the turning off of the computer system;

an operation of said second button after the operation of said first button causing the central processing unit to install said second operating system; and an operation of said first button after the operation of said second button causing the central processing unit to install said first operating system.

22. The system as claimed in claim 16, said backup memory comprising a read only memory, said central processing unit only reading, through said bus, said stored operating system from said read only memory.

23. The system as claimed in claim 22, said plurality of buttons comprising first and second buttons.

24. The system as claimed in claim 23, an initial operation of said first button causing the central processing unit to turn on the computer system and install a first operating system and a subsequent operation of the first button causing the turning off of the computer system, and an initial operation of said second button causing the central processing unit to turn on the computer system and install a second operating system and a subsequent operation of the second button causing the turning off of the computer system;

an operation of said second button after the operation of said first button causing the central processing unit to install said second operating system; and an operation of said first button after the operation of said second button causing the central processing unit to install said first operating system.

25. The system as claimed in claim 15, said plurality of buttons comprising first and second buttons.

26. The system as claimed in claim 25, an initial operation of said first button causing the central processing unit to turn on the computer system and install a first operating system and a subsequent operation of the first button causing the turning off of the computer system, and an initial operation of said second button causing the central processing unit to turn on the computer system and install a second operating system and a subsequent operation of the second button causing the turning off of the computer system;

an operation of said second button after the operation of said first button causing the central processing unit to install said second operating system; and an operation of said first button after the operation of said second button causing the central processing unit to install said first operating system.

* * * * *